(12) United States Patent
Melo et al.

(10) Patent No.: US 10,552,889 B2
(45) Date of Patent: Feb. 4, 2020

(54) REVIEW MANAGEMENT SYSTEM (71) Applicant: ADP, LLC, Roseland, NJ (US)

(72) Inventors: Jason F. Melo, Hastings-on-Hudson, NY (US); Daniel Daehyun Kim, Plainview, NY (US); Siobhan Loughman Sabino, Manalapan, NJ (US)

(73) Assignee: ADP, LLC, Roseland, NJ (US)

( * ) Notice: Subject to any disclaimer, the term of this patent is extended or adjusted under 35 U.S.C. 154(b) by 588 days.

(21) Appl. No.: 15/071,453

(22) Filed: Mar. 16, 2016

(65) Prior Publication Data
US 2017/0270588 A1 Sep. 21, 2017

(51) Int. Cl.
*G06Q 30/06* (2012.01)
*G06Q 50/00* (2012.01)

(52) U.S. Cl.
CPC ......... *G06Q 30/0631* (2013.01); *G06Q 50/01* (2013.01)

(58) Field of Classification Search
CPC ......... G06Q 30/06–0645; G06Q 30/08; G06Q 50/01
See application file for complete search history.

(56) References Cited

U.S. PATENT DOCUMENTS

| | | | |
|---|---|---|---|
| 4,479,196 A | 10/1984 | Ferrer et al. | |
| 6,330,554 B1 | 12/2001 | Altschuler et al. | |
| 7,558,769 B2 | 7/2009 | Scott et al. | |
| 7,761,342 B2 * | 7/2010 | Calabria | G06Q 10/10 705/26.1 |
| 8,326,681 B2 | 12/2012 | Di Mario | |
| 8,655,989 B2 | 2/2014 | Ritter et al. | |
| 9,183,307 B2 * | 11/2015 | He | G06F 17/30867 |
| 9,342,624 B1 * | 5/2016 | Ojha | G06Q 10/10 |
| 2002/0091568 A1 | 7/2002 | Kraft et al. | |
| 2006/0059027 A1 | 3/2006 | Berenbach et al. | |

(Continued)

FOREIGN PATENT DOCUMENTS

WO 2014070555 A1 5/2014

OTHER PUBLICATIONS

L. Baniá, A. Mihanović and M. Brakus, "Using Big Data and sentiment analysis in product evaluation," 2013 36th International Convention on Information and Communication Technology, Electronics and Microelectronics (MIPRO), Opatija, 2013, pp. 1149-1154. (Year: 2013).*

(Continued)

*Primary Examiner* — Adam L Levine
(74) *Attorney, Agent, or Firm* — Yee & Associates, P.C.

(57) ABSTRACT

A method and apparatus for processing reviews. A request for information about an item is received from a client device. A group of the reviews for the item in the request from the reviews for items is identified. A user requesting the information about the item is identified. A set of the reviews in the group of the reviews made by a set of people having an influence on the user is identified using a hypergraph. A visibility of the set of the reviews is increased. The group of the reviews with an increased visibility for the set of the reviews is sent in a response to the request, enabling displaying the group of the reviews on a display system for the client device such that the set of the reviews is more visible than other reviews in the group of the reviews.

24 Claims, 7 Drawing Sheets

(56) References Cited

U.S. PATENT DOCUMENTS

| | | |
|---|---|---|
| 2007/0203713 A1 | 8/2007 | Habichler et al. |
| 2009/0276296 A1 | 11/2009 | Spriegel |
| 2010/0049770 A1 | 2/2010 | Ismalon |
| 2012/0331134 A1 | 12/2012 | Lynn et al. |
| 2013/0006738 A1 | 1/2013 | Horvitz et al. |
| 2013/0080225 A1 | 3/2013 | Rajaram |
| 2013/0097184 A1* | 4/2013 | Berkhin ............ G06F 17/30002 707/748 |
| 2013/0282486 A1 | 10/2013 | Rahle et al. |
| 2015/0019474 A1 | 1/2015 | Barbieri et al. |
| 2015/0379445 A1 | 12/2015 | Wang et al. |
| 2016/0071162 A1 | 3/2016 | Ogawa et al. |
| 2016/0196589 A1 | 7/2016 | Subbarayan |
| 2016/0205122 A1 | 7/2016 | Bassett |
| 2017/0139920 A1* | 5/2017 | Ball .................... G06F 17/3053 |
| 2017/0236081 A1 | 8/2017 | Smith et al. |

OTHER PUBLICATIONS

Colucci et al., "Knowledge Based Approach to Semantic Composition of Teams in an Organization," ACM Symposium on Applied Computing, Mar. 2005, pp. 1314-1319.

Melo et al., Contextual Skill Management Using a Hypergraph, U.S. Appl. No. 15/071,432, filed Mar. 16, 2016, 61 pages.

Melo et al., "Marketing Management System," U.S. Appl. No. 15/071,471, filed Mar. 16, 2016, 57 pages.

Office Action, dated Dec. 13, 2018 regarding U.S. Appl. No. 15/071,471, 37 pages.

Office Action, dated Aug. 7, 2019, regarding U.S. Appl. No. 15/663,526, 19 pages.

\* cited by examiner

REVIEW MANAGEMENT SYSTEM

CROSS-REFERENCE TO RELATED APPLICATIONS

This application is related to the following patent applications: entitled "Contextual Skill Management Using a Hypergraph", Ser. No. 15/071,432; and entitled "Marketing Management System", Ser. No. 15/071,471; filed even date hereof and assigned to the same assignee. Each of the aforementioned applications is incorporated herein by reference in its entirety.

BACKGROUND INFORMATION

1. Field

The present disclosure relates generally to an improved computer system and, in particular, to a method and apparatus for processing reviews. Still more particularly, the present disclosure relates to a method and apparatus for arranging a presentation of reviews for an item based on influences on a reader of the reviews.

2. Background

The Internet is a global system of interconnected computer networks that link computers and other data processing systems worldwide. The connections are made through an array of electronic, wireless, and optical networking technologies. The Internet provides an extensive range of information and services.

The Internet is used to perform a variety of activities. For example, users employ the Internet to read articles, watch news reports, listen to music, send messages, perform research, play online games, perform banking, purchase products and services, pay bills, talk to other people using voice communications, and perform other activities over the Internet.

For example, users may access information in documents or in other forms on the World Wide Web. The World Wide Web, which is also referred to just as the Web, is an open source information space accessed through the Internet. Users typically access web pages. Web pages are primarily text documents that are formatted in a markup language, such as hypertext markup language (HTML). In addition to the formatted text, the web pages may also include images, video, software components, or other elements that are presented through a web browser. The presentation may be a display of information, an audio presentation, a multimedia presentation, or some combination thereof.

An organization, such as a company, a partnership, a charity, an educational group, a social group, a team, a city, a government agency, or some other suitable organization, may establish a presence on the Web using a website. Some organizations may perform various transactions using a website. For example, a business may offer goods or services to users through a website.

With the vast number of businesses that offer goods or services over the Web, identifying which businesses have good customer service, are reputable, or have other characteristics that are desirable in making purchases may be harder to identify than desired. Also, many products and services are present. Selecting one product or service from the myriad of products and services available may be difficult with all of the choices and options available.

One manner in which users select products or services and businesses are through reviews. Reviews have become commonplace on the Web. Reviewers who purchase products or services may provide feedback in the form of reviews. The reviews may give information about products, services, and businesses that offer products or services. This information includes the opinions formed by the reviewers for the products, services, and businesses. These reviews may be located on websites of the businesses offering items. Also, review sites are present that function as a central location for accessing reviews. A review site is a website on which reviews may be posted about people, organizations, products, or services.

Although reviews are useful, some products, services, or businesses may have hundreds or thousands of reviews that a user may view in establishing an opinion about whether to make a purchase. Reading all of the reviews may be more time-consuming than desired. Additionally, reading the reviews may be confusing when some reviewers provide high marks for an item while other reviewers give low marks for the same item. Thus, identifying which reviews may be more reliable than other reviews may be more difficult than desired in addition to the number of reviews that may be present for a particular item.

Therefore, it would be desirable to have a method and apparatus that take into account at least some of the issues discussed above, as well as other possible issues. For example, it would be desirable to have a method and apparatus that overcome a technical problem with users identifying reviews that are useful in establishing opinions about items.

SUMMARY

An embodiment of the present disclosure provides a review management system. The review management system comprises a hypergraph and a review manager. The hypergraph comprises objects representing people in a social network; edges connecting the objects for the people based on relationships between the people; and influence edges for opinion influences on opinions about items, wherein the influence edges connect the edges to identify opinion influences between the people. The review manager receives a request for information about an item from a client device. Further, the review manager identifies a group of reviews for the item in the request from reviews for items. Yet further, the review manager identifies a user requesting the information about the item. Still further, the review manager identifies a set of the reviews in the group of the reviews made by a set of people having an influence on the user using the hypergraph. Still yet further, the review manager increases a visibility of the set of the reviews. Still further, the review manager sends the group of the reviews with an increased visibility for the set of the reviews in a response to the request, enabling displaying the group of the reviews on a display system for the client device such that the set of the reviews is more visible than other reviews in the group of the reviews.

Another embodiment of the present disclosure provides a method for processing reviews. The method comprises receiving, by a computer system, a request for information about an item from a client device. Further, the method comprises identifying, by the computer system, a group of the reviews for the item in the request from the reviews for items. Yet further, the method comprises identifying, by the computer system, a user requesting the information about the item. Still further, the method comprises identifying, by the computer system, a set of the reviews in the group of the reviews made by a set of people having an influence on the user using a hypergraph comprising objects representing people in a social network; edges connecting the objects for the people based on relationships between the people; and influence edges for opinion influences on the opinions about the items, wherein the influence edges connect the edges to identify opinion influences between the people. Still yet further, the method comprises increasing, by the computer system, a visibility of the set of the reviews. Still further, the method comprises sending, by the computer system, the group of the reviews with an increased visibility for the set of the reviews in a response to the request, enabling displaying the group of the reviews on a display system for the client device such that the set of the reviews is more visible than other reviews in the group of the reviews.

Yet another embodiment of the present disclosure provides a computer program product for managing reviews. The computer program product comprises a computer readable storage media, first program code, second program code, third program code, fourth program code, fifth program code, and sixth program code. The first program code, stored on the computer readable storage media, receives a request for information about an item from a client device. The second program code, stored on the computer readable storage media, identifies a group of the reviews for the item in the request from the reviews for items. The third program code, stored on the computer readable storage media, identifies a user requesting the information about the item. The fourth program code, stored on the computer readable storage media, identifies a set of the reviews in the group of the reviews made by a set of people having an influence on the user using a hypergraph comprising objects representing people in a social network; edges connecting the objects for the people based on relationships between the people; and influence edges for opinion influences on the opinions about the items, wherein the influence edges connect the edges to identify opinion influences between the people. The fifth program code, stored on the computer readable storage media, increases a visibility of the set of the reviews. The sixth program code, stored on the computer readable storage media, sends the group of the reviews with an increased visibility for the set of the reviews in a response to the request, enabling displaying the group of the reviews on a display system for the client device such that the set of the reviews is more visible than the other reviews in the group of the reviews.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current mechanisms for displaying reviews may not reduce the amount of time needed to read the reviews or allow the user to identify which reviews may be more reliable.

For example, some review engines may organize reviews based on ratings for an item. In this manner, a user may read unfavorable reviews to see what was not desirable about an item. Additionally, the review engine may give a number of reviews different ratings as well as an average rating for reviews made on the item. Reviews also may be placed in an order as to when the reviews were submitted. In this manner, a user may see whether the item has changed such that the reviews have a trend that changes over time.

However, the user still may have an inability to determine whether a particular review is reliable or should be trusted by the review. For example, the reviewer may be biased, inexperienced with the item, or have some other characteristic that makes the review unreliable in the opinion of the user.

In some cases, a reviewer may include their credentials as to explain why the reviewer is an expert or why the reviewer should be relied upon for the particular review. However, the user still may not find the statements sufficient to form an opinion about the item based on the review.

Thus, the illustrative embodiments provide a method and apparatus for processing reviews. Processing reviews may enable a user viewing reviews for an item to more easily form an opinion about the item. In one illustrative example, a process receives a request for information about an item from a client device. A group of the reviews for the item in the request is identified from a database of the reviews for items. A user requesting information about the item is identified. A set of the reviews in the group of the reviews made by a set of people having an influence on the user is identified using a hypergraph. A visibility of the set of the reviews is increased. The group of the reviews with an increased visibility for the set of the reviews is sent in a response to the request, enabling displaying the group of the reviews on a display system for a client device such that the set of the reviews is more visible than the other reviews in the group of the reviews.

In the illustrative examples, "a set of", when used with reference to items, means zero or more items. For example, "a set of the reviews" is zero or more reviews. In other words, the set of the reviews may sometimes be a null set.

Further, as used herein, "the group of", when used with reference to items, means one or more items. For example, "a group of the reviews" is one or more reviews.

Figure 1:
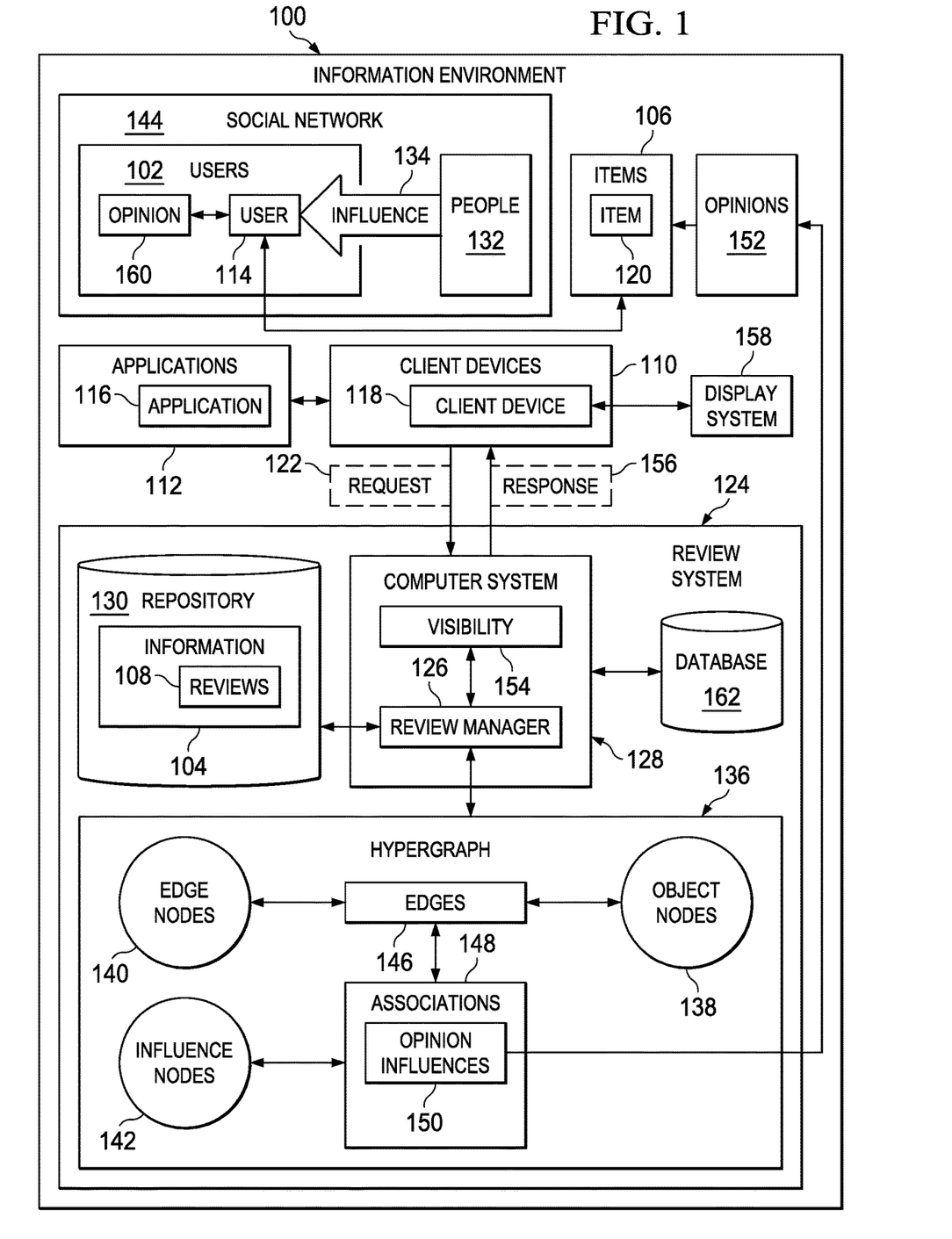
FIG. 1 is a block diagram of an information environment in accordance with an illustrative embodiment.

With reference now to the figures and, in particular, with reference to FIG. 1, a block diagram of an information environment is depicted in accordance with an illustrative embodiment. In this depicted example, information environment 100 includes users 102 who may search for and request information 104 for items 106. Information 104 includes reviews 108 for items 106. Users 102 are people. In this example, an item in items 106 is selected from one of a product, a service, an entity, a person, an organization, a company, a partnership, a charity, an educational group, a social group, a team, a city, a government agency, a theme park, a restaurant, or some other suitable item.

As depicted, users 102 may obtain information 104 about items 106 using client devices 110. A client device in client devices 110 is a physical hardware. For example, a client device may be selected from one of a desktop computer, a tablet computer, a mobile phone, a kiosk, a gaming console, or some other suitable type of data processing system.

Information 104 may be requested and presented by applications 112 for client devices 110. An application in applications 112 may be, for example, a browser, a mobile application, or some other suitable type of application that is configured to search for or request information 104.

Users 102 may examine information 104 for items 106 in making decisions on items 106, such as whether to use or purchase items 106. A review in reviews 108 comprises at least one of a comment, an evaluation, a rating, an opinion, or other suitable information. A review may in the form of text, video, audio, or some other suitable format.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, user 114 in users 102 utilizes application 116 in applications 112 for client device 118 in client devices 110 to obtain information 104 about item 120 in items 106. As depicted, user 114 interacts with application 116 for client device 118 to send request 122 for information 104 about item 120 to review system 124. In particular, request 122 is received by review manager 126 in review system 124.

Review manager 126 manages reviews 108 for items 106. In managing reviews 108, review manager 126 may perform at least one of receiving, storing, organizing, modifying, analyzing, sending, or other operations with respect to reviews 108.

As depicted, review manager 126 may be implemented in software, hardware, firmware, or a combination thereof. When software is used, the operations performed by review manager 126 may be implemented in program code configured to run on hardware, such as a processor unit. When firmware is used, the operations performed by review manager 126 may be implemented in program code and data and stored in persistent memory to run on a processor unit. When hardware is employed, the hardware may include circuits that operate to perform the operations in review manager 126.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

As depicted, review manager 126 is located in computer system 128. Computer system 128 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, reviews 108 in information 104 are stored in repository 130. Repository 130 may be a database or any type of storage mechanism or architecture in which reviews 108 may be managed by review manager 126.

When review manager 126 receives request 122 for information 104 about item 120 from client device 118, review manager 126 identifies a group of reviews 108 for item 120 in request 122 from reviews 108 for items 106. Review manager 126 also identifies user 114 requesting information 104 about item 120 and identifies a set of reviews 108 in the group of reviews 108 made by a set of people 132 having influence 134 on user 114 using hypergraph 136.

In the illustrative example, hypergraph 136 has a number of different components. As depicted, hypergraph 136 comprises objects 145, edges 146, and influence edges 148. Objects 145 are connected to each other by edges 146, and edges 146 are connected to each other by influence edges 148. Hypergraph 136 is stored in database 162. Database 162 is an organized collection of data. As depicted, database 162 may be in a single location or distributed in multiple locations. In the illustrative example, objects 145 are stored as object nodes 138, edges 146 are stored as edge nodes 140, and influence edges 148 are stored as influence nodes 142 in database 162.

Object nodes 138 represent objects 145 for people 132 in social network 144. As depicted, object nodes 138 also represent objects 145 for users 102 in social network 144. Object nodes 138 may also represent other types of objects 145, such as locations, products, services, items 106, skills, activities, positions, or other suitable types of objects.

In this illustrative example, social network 144 is a social structure comprised of individuals or organizations. In the list of examples, social network 144 may be accessed by users 102 and people 132 through an online social networking service. An online social networking service is a computer system that provides access to information in social network 144. The online social networking service may have different purposes, such as connecting people with similar interests, activities, backgrounds, real-life connections, professional interests, or other suitable things that connect people to each other. Examples of online social networking services include Facebook, LinkedIn, Instagram, Twitter, and other types of online social networking services accessed over the Internet.

In the illustrative example, edge nodes 140 represent edges 146 connecting objects 145 for people 132 based on relationships between people 132. Influence edges 148 represent opinion influences 150 that are between edges 146 that are connected to each other by influence edges 148 in which opinion influences 150 are influences on opinions 152 about items 106. Influence edges 148 connect edges 146 to identify opinion influences 150 between people 132. For example, one or more people 132 have influence 134 on user 114 in users 102 with respect to opinion 160 for item 120. Users 102, including user 114, may be part of people 132.

In the illustrative example, opinion influences 150 on opinions 152 for items 106 are identified for a group of items 106. In other words, opinion influences 150 may be for any single item or multiple items. For example, opinion influences 150 may be present for items 106 or groups of items 106 including at least one of cars, computers, televisions, lawn services, house painting services, restaurants, cleaning services, general construction contractors, utility services, cities, parks, and other suitable types of items.

Review manager 126 increases visibility 154 of the set of reviews 108 and sends the group of reviews 108 with an increased visibility for the set of reviews 108 in response 156 to request 122. As a result, review manager 126 may enable displaying, or otherwise presenting, the group of reviews 108 on display system 158 for client device 118 such that the set of reviews 108 is more visible than the other reviews in the group of reviews 108.

Application 116 on client device 118 displays the group of reviews 108 on display system 158. In this manner, user 114 may visually review the group of reviews 108 for item 120. In the illustrative example, the set of reviews 108 with an increase in visibility 154 for the set of reviews 108 is more likely to be seen by user 114.

In this manner, user 114 may be able to form opinion 160 for item 120 with an ability to rely on the set of reviews 108 from the set of people 132 that have influence 134 on user 114. For example, user 114 may find the set of reviews 108 from the set of people 132 more trustworthy or reliable than other reviews in the group of reviews 108.

Review manager 126 provides an ability for user 114 to more easily find selected reviews in the group of reviews 108 in forming opinion 160 with more certainty, more quickly, or some combination thereof, as compared to having to review all of the group of reviews 108. For example, if the group of reviews 108 includes hundreds of reviews, user 114 may only read the set of reviews 108 rather than reading all of the group of reviews 108. In this manner, an ability to more easily see reviews 108 from people 132 that user 114 finds reliable aids user 114 in forming opinion 160 with less frustration and in less time.

In one illustrative example, one or more technical solutions are present that overcome a technical problem with users identifying reviews that are useful in establishing opinions about items. For example, review manager 126 identifies reviews 108 for item 120 that is of interest to user 114. Additionally, review manager 126 determines whether any of people 132 making reviews 108 for item 120 have influence 134 on user 114 in forming opinion 160 about item 120. Visibility 154 of any of reviews 108 by people 132 having influence 134 on user 114 is increased by review manager 126 in a manner that user 114 may more easily and more quickly see those reviews.

The increase in visibility 154 may be especially useful if the number of reviews 108 for item 120 is in the hundreds. In this manner, user 114 may more easily find a set of reviews 108 that user 114 considers more useful or reliable to user 114.

As a result, one or more technical solutions may provide a technical effect of aiding the users who are reading reviews 108 in forming opinions 152 on items 106. The technical solutions may allow users 102 to know which ones of reviews 108 may be more reliable or useful.

Further, the illustrative embodiments also recognize and take into account that a technical issue may be present with respect to storing information about opinion influences 150 in hypergraph 136. In the illustrative example, object nodes 138, edge nodes 140, and influence nodes 142 provide another technical solution to the technical issue of storing influences that some of people 132 have on others of people 132, such as user 114, with respect to opinion 160 formed by user 114 with respect to item 120.

The addition of influence edges 148 stored as influence nodes 142 provides a technical solution to a technical problem with users identifying reviews 108 that are useful in establishing opinions 152 about items 106. This technical solution involves storing opinion influences 150 in hypergraph 136 in database 162 in a manner that allows for identifying which ones of reviews 108 may be increased in visibility 154.

As a result, computer system 128 operates as a special purpose computer system in which review manager 126 in computer system 128 enables identifying reviews 108 that are more useful to users 102 more quickly. In particular, review manager 126 transforms computer system 128 into a special purpose computer system, as compared to currently available general computer systems that do not have review manager 126. One of the features in the special purpose computer with review manager 126 is an ability to identify people 132 that have influence 134 on user 114. Another feature that may be present in the special purpose computer with review manager 126 is increasing visibility 154 of the set of reviews 108 by the set of people 132 that have influence 134 on user 114 in forming opinion 160 about item 120.

Further, the manner in which information is stored in hypergraph 136 in database 162 located within computer system 128 also makes computer system 128 a special purpose computer. For example, representing edges 146 as edge nodes 140 provides a technical feature in which connections between edges 146 may be made and stored in a similar fashion in which objects 145 are stored as object nodes 138 in hypergraph 136 in database 162. In a similar fashion, influence edges 148 also may be stored in the form of influence nodes 142.

Figure 3:
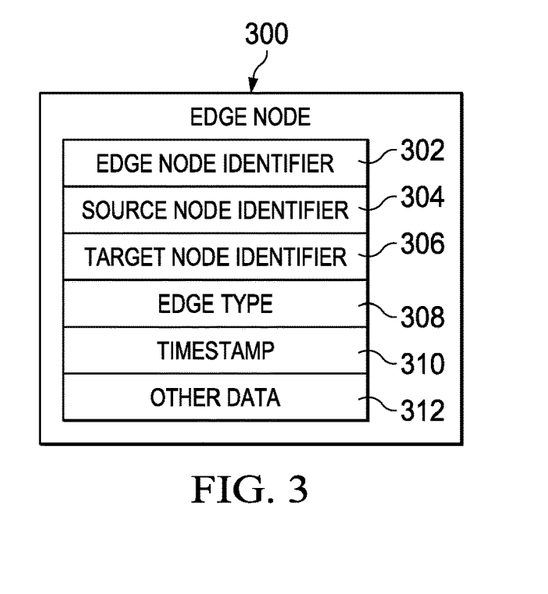
FIG. 3 is a block diagram of an edge node in accordance with an illustrative embodiment.
Figure 4:
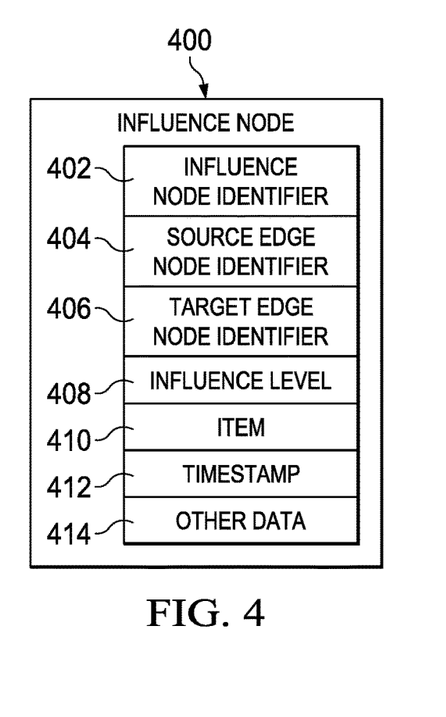
FIG. 4 is a block diagram of an influence node in accordance with an illustrative embodiment.

This type of representation of edges 146 and influence edges 148 provides a technical solution that allows for edges 146 and influence edges 148 and information about edges 146 and influence edges 148 to be stored in database 162. Examples of information that may be stored in edge nodes 140 and influence nodes 142 are shown in FIG. 3 and FIG. 4 below.

In this manner, computer system 128 operates as a special purpose computer in which review manager 126 may perform analysis on opinion influences 150 that influence opinions 152 on items 106. This type of analysis is not possible with currently available hypergraphs that do not use the architecture in which edge nodes 140 and influence nodes 142 are used as additional types of nodes in addition to object nodes 138 in hypergraph 136.

In other words, the manner in which information is stored and organized in hypergraph 136 in database 162 enables storing identifications of opinion influences 150 with respect to items 106. One technical solution involves using influence edges 148 to connect a first portion of edges 146 and a second portion of edges 146 to each other in a manner that identifies opinion influences 150 with respect to opinions 152 for items 106.

With these types of data structures, computer system 128 operates as a special purpose computer to provide an ability to identify opinion influences 150 on opinions 152 formed on items 106 in a manner that may be used to change visibility 154 of a group of reviews 108 to make information 104 more useful in forming opinions 152 and the purchasing of items 106. For example, web pages may be generated with the change in visibility for a group of reviews 108.

Figure 2:
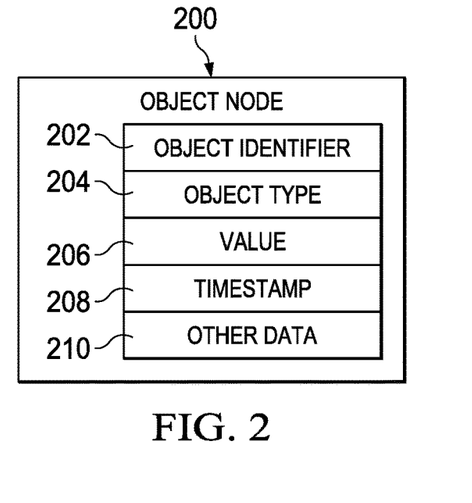
FIG. 2 is a block diagram of an object node in accordance with an illustrative embodiment.

With reference now to FIG. 2, a block diagram of an object node is depicted in accordance with an illustrative embodiment. In the illustrative examples, the same reference numeral may be used in more than one figure. This reuse of a reference numeral in different figures represents the same element in the different figures.

In this illustrative example, object node 200 is an example of an object node in object nodes 138 in FIG. 1. Object node 200 has a number of different fields. As depicted, object node 200 includes object identifier 202, object type 204, value 206, timestamp 208, and other data 210.

Object identifier 202 is a value that uniquely identifies object node 200 from other object nodes. The value is unique within a hypergraph.

As depicted, object type 204 identifies the type of object for object node 200. For example, object type 204 may be selected from a group comprising a person, a skill, a location, a position, a team, a department, and some other type of object. In this illustrative example, object type 204 represents individuals in social network 144, such as a person in people 132 and user 114 in users 102 in FIG. 1. Object type 204 may also represent opinions for the individuals.

In this illustrative example, value 206 may be a number, a string, an alphanumeric value, or in some other suitable format. For example, when object type 204 is a person, value 206 may be the name of the person. As another example, when object type 204 is an item, value 206 may be the name of the item. In some illustrative examples, items 106 also may be represented in hypergraph 136 by object nodes 138 in FIG. 1.

Timestamp 208 identifies when object node 200 was last changed. Other data 210 may be different for different types of object nodes. For example, other data 210 may include at least one of a level of skill, the time that the skill has been possessed by a person, the specialties for the skill, or other suitable information.

Turning next to FIG. 3, a block diagram of an edge node is depicted in accordance with an illustrative embodiment. In this example, edge node 300 is an example of an edge node in edge nodes 140 in FIG. 1. Edge node 300 is a data structure used for storing information about an edge connecting two object nodes. The edge may be a line.

In the illustrative example, edge node 300 includes a number of different fields. Edge node 300 includes edge node identifier 302, source node identifier 304, target node identifier 306, edge type 308, timestamp 310, and other data 312.

Edge node identifier 302 is a value that uniquely identifies edge node 300 from other edge nodes. The value is unique within a hypergraph.

As depicted, source node identifier 304 identifies a first object node, and target node identifier 306 identifies a second object node connected by the edge, as described by edge node 300. A source node is an object node that has a connection to the target node. In other words, the connection may be one that belongs to the source node.

For example, the target node may be a first person that has a connection to a second person, which is the source node. In another example, the source node may be a manager, and the target node is an employee that reports to the manager. In some cases, the designation of a target node and a source node is not needed when a general connection is present between two individuals in a social network.

In the illustrative example, edge type 308 identifies the type of edge that is present. As depicted, edge type 308 may be selected from a group comprising "reports to", "possesses", "located at", "part of", or some other suitable type of edge.

For example, edge node 300 may have a person as a source node and an opinion as a target node with edge type 308 being "possesses" to show that the person possesses an opinion. In another example, the source node is a person, the target node is a building location, and edge type 308 is "located at" to show that the person is located at the building location.

Timestamp 310 identifies when edge node 300 was last changed. Other data 312 is any other data that may be used to describe the edge.

In FIG. 4, a block diagram of an influence node is depicted in accordance with an illustrative embodiment. In this illustrative example, influence node 400 is an example of an influence node in influence nodes 142 in FIG. 1. Influence node 400 is a data structure for storing information about an association between two edges. In some illustrative examples, the association may also be referred to as an edge, a connector, or a line that connects two edges to each other.

In the illustrative example, this association represented by influence node 400 is the influence of one edge on another edge, with respect to opinions that a person may have. For example, a first edge is present between a first person and an opinion, and a second edge is present between the first person and a second person. The influence node may be graphically represented by a third edge that connects the first edge and the second edge to each other.

In the illustrative example, influence node 400 has a number of different fields. As depicted, influence node 400 includes influence node identifier 402, source edge node identifier 404, target edge node identifier 406, influence level 408, item 410, timestamp 412, and other data 414.

Influence node identifier 402 is a value that uniquely identifies influence node 400 from other influence nodes. The value of influence node identifier 402 is unique within a hypergraph.

Source edge node identifier 404 identifies a first edge, and target edge node identifier 406 identifies a second edge for which an association between the first edge and the second edge is present. Source edge node identifier 404 identifies a first edge that has an influence on a second edge. The second edge is identified by target edge node identifier 406.

Both edges, the first edge and the second edge, have one object node in common. The object node in common is a person. For example, the first edge identified by source edge node identifier 404 is the person "possesses" an opinion, and the second edge identified by target edge node identifier 406 is the person "connected to" a user.

In this example, influence node 400 identifies an influence of the first edge, which is identified by source edge node identifier 404 on a second edge, which is identified by target edge node identifier 406. Thus, the first edge is a source edge that influences the second edge, which is a target edge. In other words, the first edge influences the second edge.

As depicted, the influence is the influence that a person has on a second person. The second person can be a user that reads reviews made by the person. For example, the user is influenced by the opinion that the person has about an item. For example, when the person has a particular opinion about the item, the user is likely to agree with or adopt that opinion about the item. In this manner, the opinion of the person influences the opinion of the user, which is identified using influence node 400.

Influence level 408 identifies the level of an influence of the first edge, which is identified by source edge node identifier 404 on the second edge, which is identified by target edge node identifier 406. Influence level 408 indicates the likelihood that the user will have the same opinion as the person.

Influence level 408 may be identified in a number of different ways. For example, an operator inputs a value for the likelihood that the user will adopt or agree with the opinion of the person.

As another example, a statistical analysis may be made to identify the value of influence level 408. For example, with the person providing opinions on items, analysis may be identified as to how often the user agrees with or likes the opinions made by the person. This information may be identified in the social network.

Item 410 identifies one or more items for which the influence on opinions is present. The person may have an influence on the user for one item, but not for another item. For example, the person may have an influence on the user with respect to opinions on automobiles, but may have no influence on opinions regarding lawn services. Further, different items may have different influence levels identified in influence level 408. In other words, influence level 408 may include a value for each item in item 410.

Timestamp 412 identifies when influence node 400 was last changed. Other data 414 may include any other information about the influence.

Figure 5:
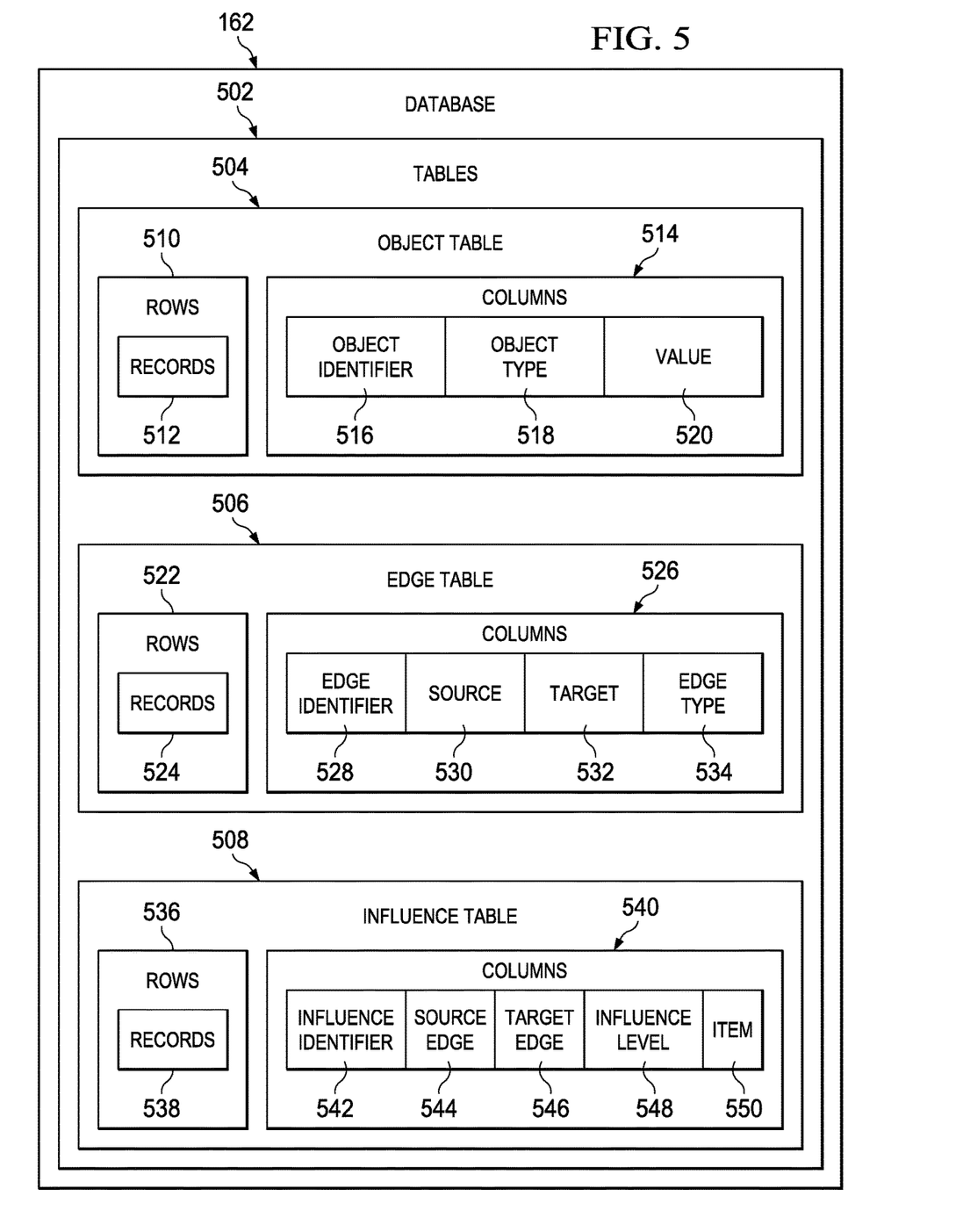
FIG. 5 is a block diagram of a database in accordance with an illustrative embodiment.

With reference now to FIG. 5, a block diagram of a database is depicted in accordance with an illustrative embodiment. In this illustrative example, an example of one implementation for database 162 is shown. As depicted, database 162 includes tables 502. Tables 502 include object table 504, edge table 506, and influence table 508.

Object table 504 includes rows 510 for records 512. Records 512 stores information for object nodes 138 in FIG. 1. Each record in records 512 stores information for a single object node, such as object node 200 in FIG. 2.

Object table 504 also includes columns 514. Each column in columns 514 represents fields in records 512. As depicted, columns 514 include object identifier 516, object type 518, and value 520.

In this illustrative example, edge table 506 includes rows 522 for records 524. Records 524 store information for edge nodes 140 in FIG. 1. Each record in records 524 stores information for a single edge node, such as edge node 300 in FIG. 3.

Edge table 506 also includes columns 526. Each column in columns 526 represents fields in records 524. As depicted, columns 526 include edge identifier 528, source 530, target 532, and edge type 534.

In this illustrative example, influence table 508 includes rows 536 for records 538. Records 538 store information for influence nodes 142 in FIG. 1. Each record in records 538 stores information for a single influence node, such as influence node 400 in FIG. 4.

Influence table 508 also includes columns 540. Each column in columns 540 represents fields in records 538. As depicted, columns 540 include influence identifier 542, source edge 544, target edge 546, influence level 548, and item 550.

Figure 6:
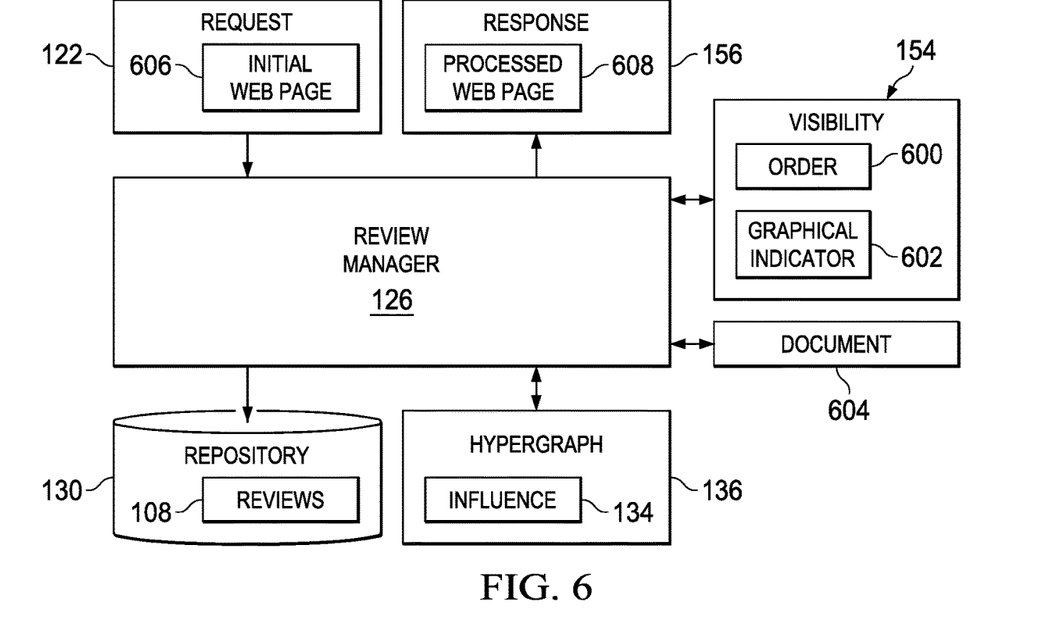
FIG. 6 is a block diagram of dataflow for identifying reviews in accordance with an illustrative embodiment.

With reference next to FIG. 6, a block diagram of dataflow for identifying reviews is depicted in accordance with an illustrative embodiment. In this illustrative example, review manager 126 receives request 122 for information 104 for item 120 in FIG. 1. In response to receiving request 122, review manager 126 identifies a group of reviews 108 for item 120 from reviews 108 in repository 130.

Additionally, review manager 126 identifies user 114 in FIG. 1 to which the group of reviews 108 is to be presented. Based on the identification of user 114, review manager 126 identifies a set of reviews 108 made by the set of people 132 in FIG. 1 in hypergraph 136 that has influence 134 on user 114 with respect to opinion 160 in FIG. 1 for item 120.

Review manager 126 increases visibility 154 of the set of reviews 108 within the group of reviews 108. As depicted, visibility 154 may be increased in a number of different ways. In this illustrative example, visibility 154 is increased by placing the group of reviews 108 into order 600. Order 600 is such that a set of reviews 108 is displayed, or otherwise presented, earlier than other reviews in the group of reviews 108.

In this manner, review manager 126 may cause the display of the group of reviews 108 on display system 158 for client device 118 in FIG. 1. The set of reviews 108 in the group of reviews 108 is displayed earlier than other reviews in the group of reviews 108.

In other illustrative examples, visibility 154 may be increased by associating graphical indicator 602 with each review in the set of reviews 108. Associating graphical indicator 602 with a review means that graphical indicator 602 may be displayed on or in the proximity of the review such that the attention of a viewer is drawn to the review.

Graphical indicator 602 may be different for each review depending on the implementation. In this illustrative example, graphical indicator 602 is selected from at least one of a color, a flashing text, a font, a font size, bolding, an icon, italics, underlining, highlighting, or some other suitable graphical indicator that draws the attention of user 114 in FIG. 1 to the set of reviews 108 when viewing the group of reviews 108.

Review manager 126 places the group of reviews 108 with at least one of order 600 or graphical indicator 602 that increases visibility 154 for the set of reviews 108 into response 156. Review manager 126 then sends response 156 to client device 118 in FIG. 1 for display.

In one illustrative example, review manager 126 creates document 604 that contains the group of reviews 108 in which the set of reviews 108 in the group of reviews 108 is displayed earlier than other reviews in the group of reviews 108 when document 604 is displayed.

Document 604 may take various forms depending on the implementation. For example, document 604 may be, for example, a web page in a markup language, such as hypertext markup language (HTML), extensible markup language (XML), or some other suitable markup language for display on a browser or other application that is able to display the web page. Review manager 126 places document 604 into response 156. Response 156 is sent to client device 118.

In another example, request 122 may be received from a web server and may include initial web page 606 with the group of reviews 108 identifying the group of people 132 in FIG. 1 making the group of reviews 108. Review manager 126 may search for the set of people 132 making the group of reviews 108. When the set of people 132 is not a null set, review manager 126 increases visibility 154 for the set of reviews 108 in initial web page 606 to form processed web page 608 for user 114 in FIG. 1. Processed web page 608 is returned in response 156.

The illustration of information environment 100 and the different components in FIGS. 1-6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, user 114 may request a web page with information 104 about item 120 in FIG. 1. This request may be sent to a web server. The web server may generate a web page containing information 104 about item 120. The web page may include a group of reviews 108 for item 120 obtained from review manager 126. For example, the web server may request any of reviews 108 present for item 120. Review manager 126 returns the group of reviews 108 for item 120, including an increase in visibility 154 for a set of reviews 108 in the manner described above. These reviews may be incorporated into a web page generated by the web server and returned to client device 118 for display by application 116 on display system 158 to user 114 in FIG. 1.

In another example, information 104 may also include other information in addition to reviews 108. For example, information 104 may include descriptions, specifications, or other suitable information about items 106.

In another example, document 604 may include at least one of text, code, script, or other content that is used by a web server in creating a web page. Document 604 may be sent to a client, such as the web server.

As another example, review manager 126 may be included as part of an online social networking service. In other illustrative examples, review manager 126 may be implemented in servers providing websites. Further, information environment 100 may include one or more social networks in addition to or in place of social network 144 shown in block form in FIG. 1. As another example, database 162 may be part of computer system 128 in some illustrative examples.

Figure 7:
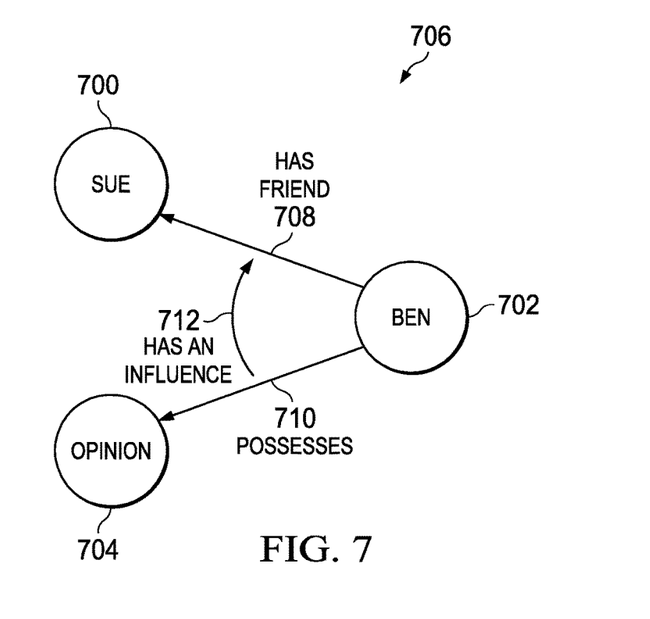
FIG. 7 is an illustration of an influence on an opinion formed by a user in accordance with an illustrative embodiment.

With reference to FIG. 7, an illustration of an influence on an opinion formed by a user is depicted in accordance with an illustrative embodiment. A portion of a hypergraph is shown to illustrate the influence a first person may have on a second person.

As depicted, Sue 700, Ben 702, and opinion 704 are vertices in hypergraph 706. These vertices may be represented in data structures as object nodes 138 in FIG. 1. This portion of hypergraph 706 is an example of one implementation of hypergraph 136 shown in block form in FIG. 1.

Sue 700 and Ben 702 are people. As depicted, "has friend" 708 is an edge that connects Sue 700 and Ben 702 as friends. In this example, "possesses" 710 is an edge showing that Ben 702 possesses opinion 704. As depicted, the edges "has friend" 708 and "possesses" 710 may be represented in data structures as edge nodes.

Also in this example, "has an influence" 712 is a line that connects "possesses" 710 to "has friend" 708, which are edges. As depicted, "has an influence" 712 is a line for an influence edge connecting edges and may be represented in a data structure by an influence node in influence nodes 142 in FIG. 1.

In this illustrative example, "has an influence" 712 shows an association between "has friend" 708 and "possesses" 710. Thus, the influence edge "has an influence" 712 shows that Ben 702 has an influence on Sue 700 with opinion 704 held by Ben 702.

In other words, when Sue 700 obtains opinion 704 by Ben 702, Sue 700 is influenced by opinion 704. In this illustrative example, opinion 704 is expressed in a review written by Ben 702. Sue 700 may rely on opinion 704 made by Ben 702 in evaluating an item. The reliance may be more so as compared to reviews by other people that do not have an influence on Sue 700.

In this illustrative example, Sue 700 may be user 114 shown in block form in FIG. 1. Ben 702 may be a person in the set of people 132 that makes a set of reviews 108 for item 120 in FIG. 1.

The amount of influence that Ben 702 has on Sue 700 may be identified by an influence node, such as influence node 400 shown in block form in FIG. 4. In this example, "has an influence" 712 may include a level of influence as well as a group of items over which an influence is present for Sue 700 for opinion 704. The influence may be only valid for some items and not for other items.

As depicted, opinion 704 is a general opinion and not necessarily for a specific type of item. The types of items for which an influence is present may be identified by the influence node.

The illustration of the portion of the hypergraph shown in FIG. 7 is not meant to limit the manner in which other illustrative examples may be implemented. For example, only three object nodes are shown in FIG. 7. The complete hypergraph may include hundreds or thousands of object nodes. Further, other types of object nodes, other than people, also may be present in the hypergraph. For example, the object nodes may also represent skills, locations, or other suitable objects.

Figure 8:
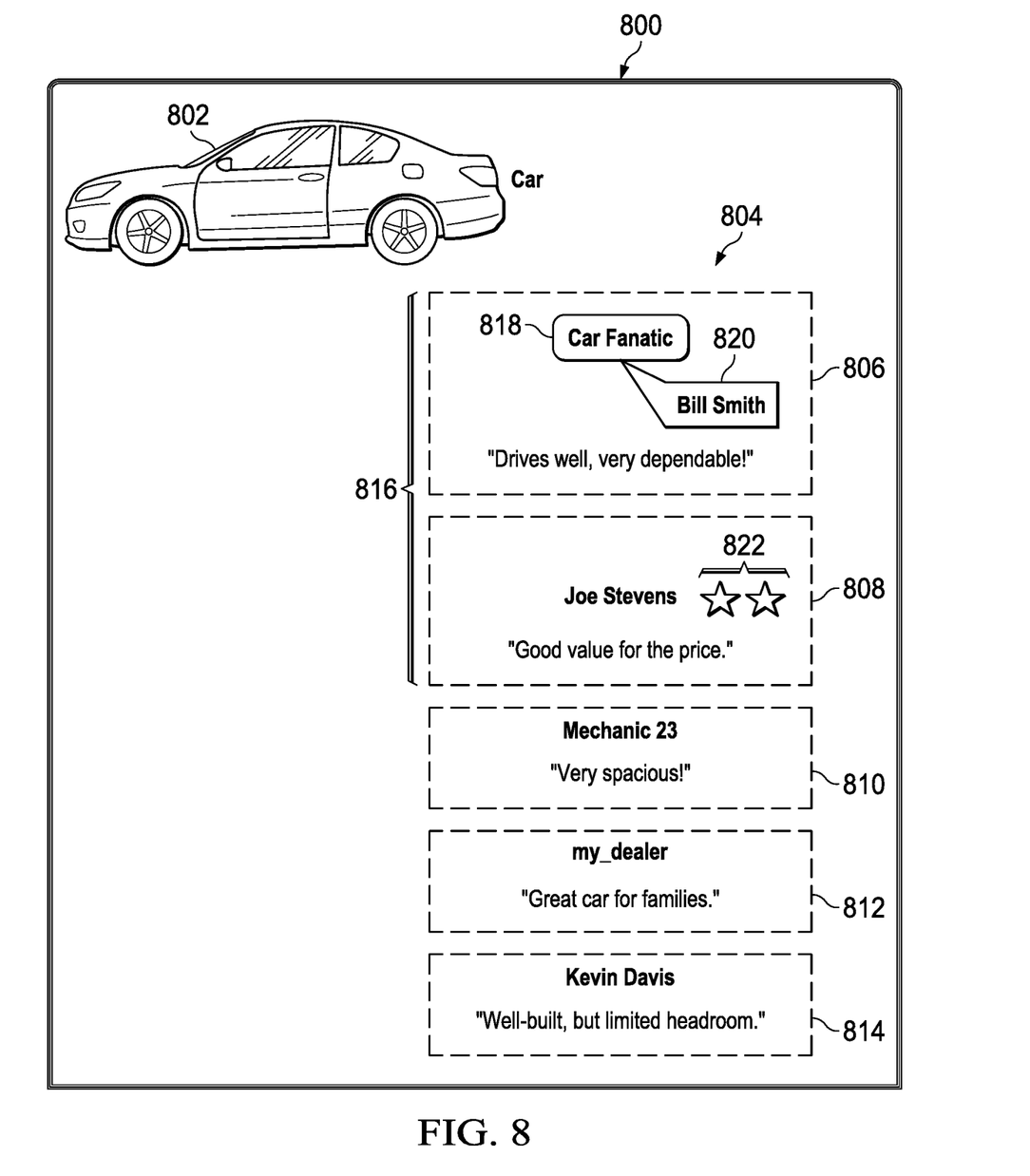
FIG. 8 is an illustration of a display of a review for an item in accordance with an illustrative embodiment.

Turning next to FIG. 8, an illustration of a display of a review for an item is depicted in accordance with an illustrative embodiment. In this illustrative example, graphical user interface 800 is an example of a display of a group of reviews 108 on display system 158 for client device 118 in FIG. 1. In this illustrative example, graphical user interface 800 is generated by application 116 in FIG. 1 for client device 118. For example, graphical user interface 800 may be an interface for a browser.

As depicted in graphical user interface 800, car 802 is an example of item 120 in FIG. 1 for which reviews 804 are displayed. In this illustrative example, reviews 804 currently displayed on graphical user interface 800 include review 806, review 808, review 810, review 812, and review 814.

In this illustrative example, review 806 and review 808 in section 816 are a set of reviews 804. This set of reviews 804 in section 816 is made by reviewers that have an influence on the user reading reviews 804 in graphical user interface 800. As depicted, the visibility of review 806 and review 808 is increased in this illustrative example.

The visibility may be increased in a number of different ways as shown in graphical user interface 800. For example, review 806 and review 808 are placed in order such that these two reviews are seen prior to other reviews in reviews 804. In this illustrative example, other reviews are present that are not displayable in graphical user interface 800 without the user scrolling down in graphical user interface 800.

Additionally, graphical indicators such as highlighting 818 may be used to draw the attention of the user to the review. Highlighting 818 may indicate that review 806 is from a person whose opinion the user trusts or values for this particular item. In another illustrative example, the name of the person that has an influence on the opinions of the user may also be displayed as a graphical indicator, as shown in tooltip 820, when the screen names on the reviews are not the actual names of the people making the reviews.

As another illustrative example, a graphical indicator may take the form of a number of stars 822 associated with review 808. The number of stars 822 may indicate the level of influence that the person making review 808 has on the user. In other words, the user may look at the number of stars 822 to determine how much value the opinion made in review 808 may have to the user.

The illustration of an increase in visibility of reviews for people having an influence on a user in FIG. 8 is provided as an example of how a set of the reviews by the people having an influence on the user may have those reviews increased in visibility. This example is not meant to limit the manner in which reviews may be displayed with increased visibility in other illustrative examples.

For example, when reviews are by people that have an influence on the user, the actual names of those people may be displayed in place of screen names with highlighting to indicate that the names are for people known to the user. In another illustrative example, graphical indicators may be omitted, and the increased visibility is based on the order of the reviews in which reviews made by people having an influence on the user are shown earlier or near the top of graphical user interface 800.

Figure 9:
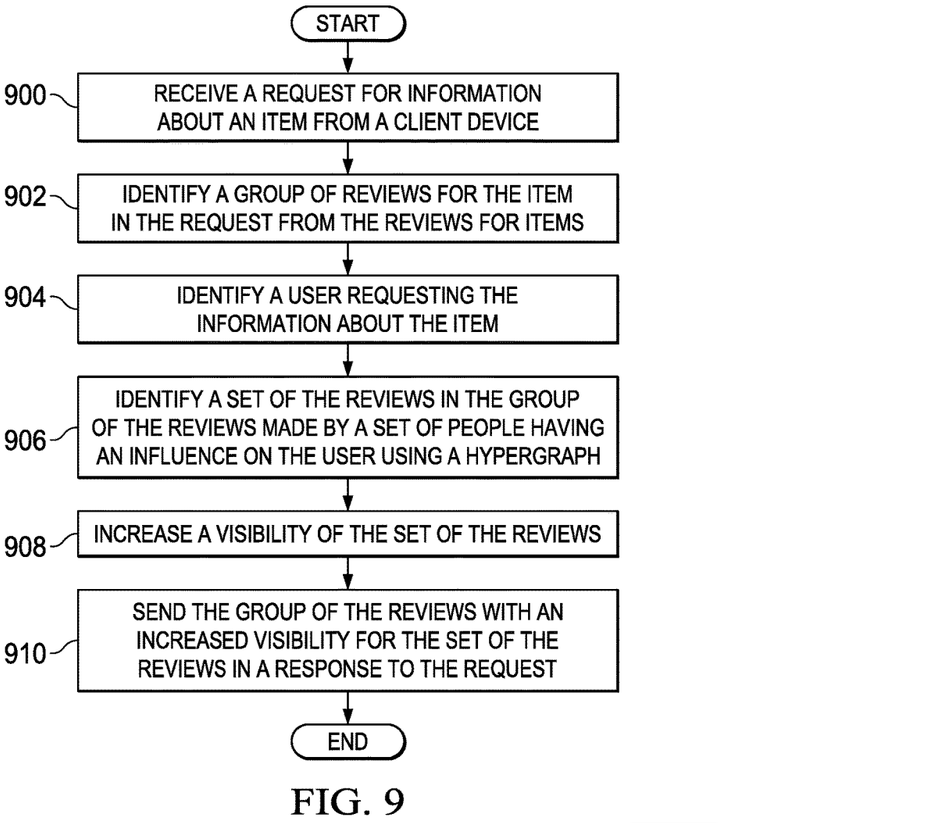
FIG. 9 is a flowchart of a process for processing reviews in accordance with an illustrative embodiment.

Turning next to FIG. 9, a flowchart of a process for processing reviews is depicted in accordance with an illustrative embodiment. The process illustrated in FIG. 9 may be implemented in information environment 100 in FIG. 1. For example, the process may be implemented in program code, circuits, or some combination thereof in review manager 126 shown in block form in FIG. 1.

The process begins by receiving a request for information about an item from a client device (step 900). The process identifies a group of reviews for the item in the request from the reviews for items (step 902). The process identifies a user requesting the information about the item (step 904).

The process identifies a set of the reviews in the group of the reviews made by a set of people having an influence on the user using a hypergraph (step 906). The hypergraph comprises object representing the people in a social network; edge connecting the objects for the people based on relationships between the people; and influence edges representing opinion influences between the edges in which the opinion influences are for the opinions of items.

In this example, the process increases a visibility of the set of the reviews (step 908). The process sends the group of the reviews with an increased visibility for the set of the reviews in a response to the request (step 910) with the process terminating thereafter. In this manner, displaying the group of the reviews on a display system for a client device such that the set of the reviews is more visible than the other reviews in the group of the reviews is enabled.

Figure 10:
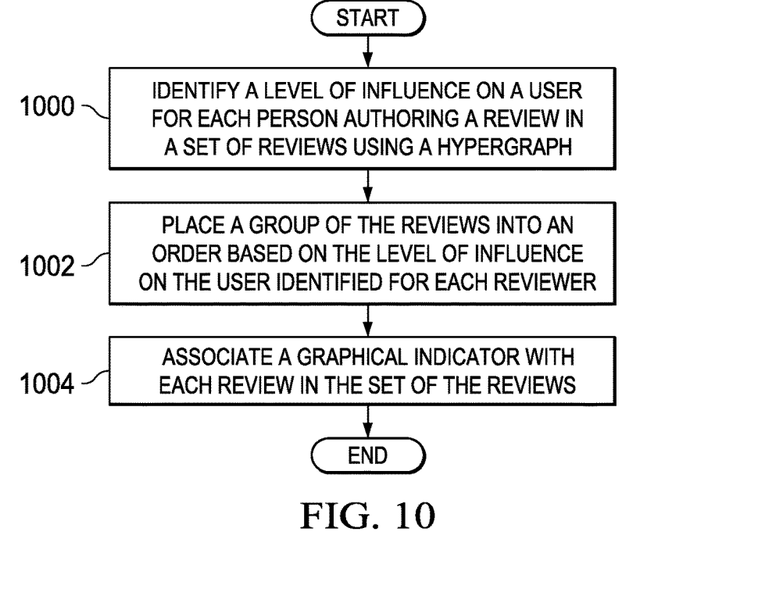
FIG. 10 is a flowchart of a process for increasing visibility for a set of reviews in accordance with an illustrative embodiment.

Turning next to FIG. 10, a flowchart of a process for increasing visibility for a set of reviews is depicted in accordance with an illustrative embodiment. The process is an example of one implementation for step 908 in FIG. 9. The process in this flowchart may increase the visibility of the set of reviews by placing a group of reviews into an order such that the set of reviews is located earlier in the order than other reviews in the group of reviews such that the set of reviews is displayed earlier than the other reviews in the group of reviews.

The process identifies a level of influence on a user for each person authoring a review in a set of reviews using a hypergraph (step 1000). Step 1000 is performed using a hypergraph, such as hypergraph 136 in FIG. 1, which has information about people who have an influence on the user.

The process places the group of the reviews into an order based on the level of an influence on the user identified for each reviewer (step 1002). For example, the set of the reviews made by the people having an influence on the user may be higher or earlier in the order of the reviews.

The process associates a graphical indicator with each review in the set of the reviews (step 1004) with the process terminating thereafter. In step 1004, each review may be assigned the same graphical indicator.

Alternatively, the graphical indicator assigned to each review in the set of the reviews may be assigned based on the level of an influence.

For example, stars may be assigned to the review when the reviewer has an influence on the user. The stars are displayed in association with the review. The number of stars associated with a particular review may be based on the level of an influence. For example, a review with a highest level of an influence may have five stars while a review with the lowest level of an influence may be associated with one star.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or a step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

For example, step 1004 in FIG. 10 may be omitted. As another example, step 1002 may be omitted in another implementation.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
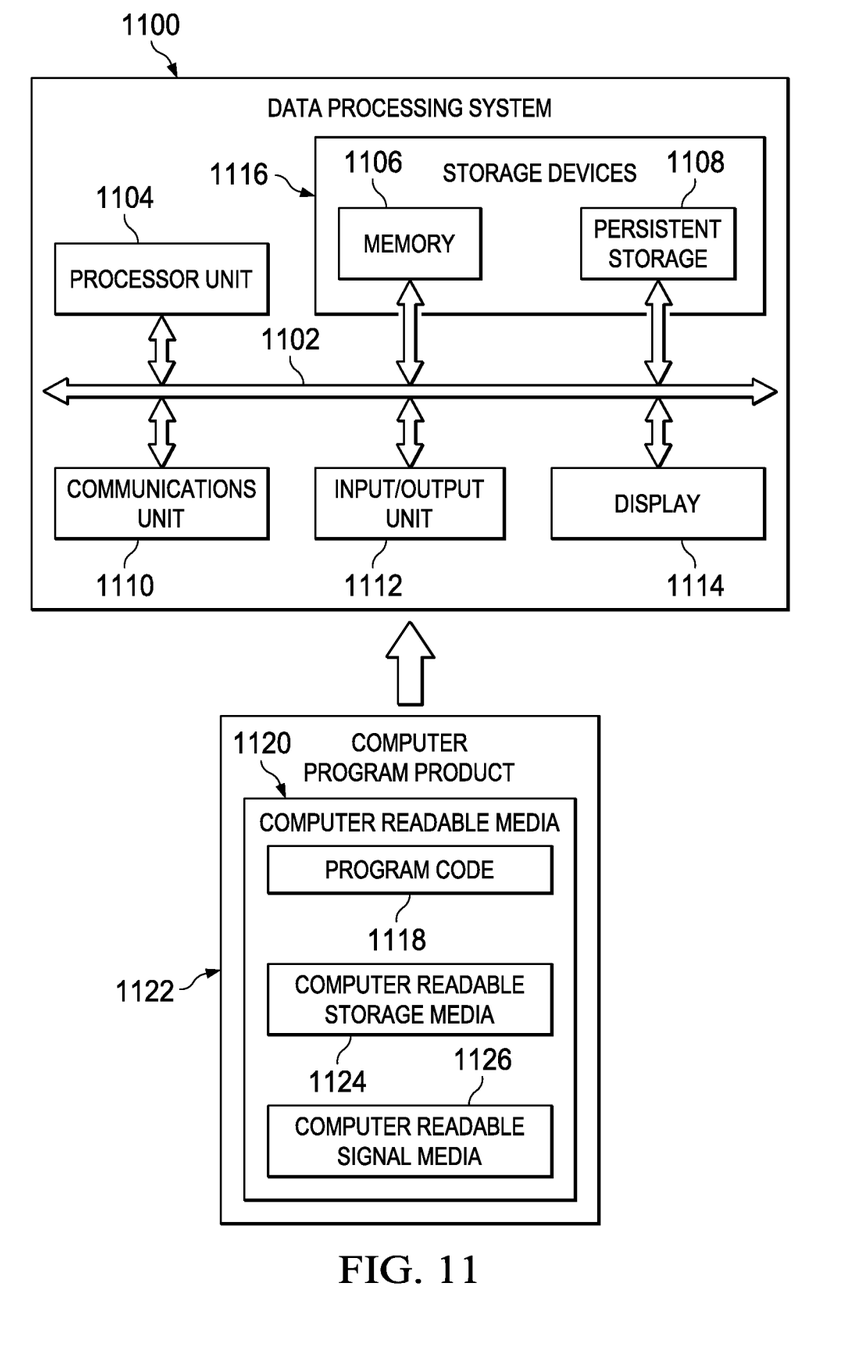
FIG. 11 is a block diagram of a data processing system in accordance with an illustrative embodiment.

Turning now to FIG. 11, a block diagram of a data processing system is depicted in accordance with an illustrative embodiment. Data processing system 1100 may be used to implement data processing systems in information environment 100, such as client devices 110 and computer system 128 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid state hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126. In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, the illustrative examples provide a method and apparatus that overcome a technical problem with users identifying reviews that are useful in establishing opinions about items. As described above, different technical solutions provide an ability for users to more easily view reviews by people who have an influence on the user. This influence is an influence on the opinion that the user may form for an item.

In this manner, the user may more easily form an opinion for an item with less time and confusion. The user may rely more on a set of reviews in the reviews displayed when the set of reviews is by people who have an influence on the user.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. For example, the presentation of reviews has been described with respect to displaying reviews on a client device. In some illustrative examples, the reviews may be presented in an audio form for those who are visually challenged. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A review management system comprising:
   one or more processors; and
   a non-transitory, computer-readable medium storing instructions, which when executed by the one or more processors:
   implements a hypergraph comprising:
      a first set of objects comprising people in a social network;
      a second set of objects comprising opinions about items;
      a set of first edge types that connect source objects in the first set of objects to target objects in the second set of objects, wherein a first edge from the set of first edge types is an opinion expressed by a first person in the social network about a specified item;
      a set of second edge types that connect the source objects to target objects in the first set of objects, wherein a second edge from the set of second edge types is a relationship between the first person in the social network and a second person in the social network; and
      a set of influence edges that connect the set of first edge types to the set of second edge types, wherein an influence edge of the set of influence edges corresponds to an influence level, wherein the influence edge indicates influence the first person has on the second person, the influence edge comprising a source edge and a target edge different than the source edge, the influence level indicating a likelihood that the second person will have a same opinion as the first person, wherein the influence level is dependent on type of item, and the influence edge is different than the influence level; and
   implements a review manager that:
      receives a request for information about an item from a client device;
      identifies a group of reviews for the item, the group of reviews provided by reviewers who are people in the social network;
      identifies a user requesting the information about the item, wherein the user is a person in the social network;
      identifies, using the hypergraph, respective influence levels of the reviewers on the user;
      in response to the request, orders reviews of the group of reviews based on the respective influence levels; and
      after ordering the reviews, displays the reviews on a display system such that reviews from reviewers having a higher influence level are displayed with greater visibility than reviews from reviewers with lower influence levels, wherein the greater visibility facilitates the user forming an opinion about the item with less frustration or in less time.

2. The review management system of claim 1, wherein the first set of objects and second set of objects are stored as object nodes in a database in a computer system, the set of first edge types and the set of second edge types are stored as edge nodes in the database in the computer system, and the set of influence edges is stored as influence nodes in the database in the computer system.

3. The review management system of claim 1, wherein the greater visibility comprises:
   placing the reviews into an order such that higher influence reviews are located earlier in the order than lower influence reviews.

4. The review management system of claim 1, wherein the review manager creates a document that contains the reviews in which higher influence reviews are displayed earlier than lower influence reviews when the document is displayed.

5. The review management system of claim 1, wherein the greater visibility comprises the review manager associating a graphical indicator with each review.

6. The review management system of claim 5, wherein the graphical indicator is selected at least one of a color, a flashing text, a font, a font size bolding, an icon, italics, underlining, or highlighting.

7. The review management system of claim 1, wherein influence levels on opinions for the items is selected for a group of items.

8. The review management system of claim 1, wherein the item is selected from one of a product, a service, an entity, a person, an organization, company, a partnership, a charity, an educational group, a social group, a team, a city, a government agency, a theme park, and a restaurant.

9. A method for processing reviews, the method comprising:
   a computing device:
      receiving a request for information about an item from a client device;
      identifying a group of reviews associated with the item in the request;
      identifying a user requesting the information about the item;
      identifying using a hypergraph, respective influence levels of reviewers on the user, wherein the hypergraph comprises:
         a first set of objects representing people in a social network, wherein the reviewers and user are people in the social network;
         a second set of objects representing opinions about items;
         a set of first edge types that connect source objects in the first set of objects to target objects in the second set of objects, wherein a first edge from the set of first edge types represents an opinion expressed by a first person in the social network about a specified item;
         a set of second edge types that connect the source objects to target objects in the first set of objects, wherein a second edge from the set of second edge types represents a relationship between the first person in the social network and a second person in the social network; and
         a set of influence edges that connect the set of first edge types to the set of second edge types, wherein an influence edge represents an influence level that the first person has on the second person, wherein the influence level indicates a likelihood that the second person will have a same opinion as the first person, wherein the influence level is dependent on type of item; and sending the group of reviews in a response to the request, enabling displaying the group of reviews on a display system for the client device such that reviews from reviewers having a higher influence level on the user are displayed with greater visibility than reviews from reviewers with lower influence levels, wherein the greater visibility facilitates formation of an opinion about the item with less frustration or in less time.

10. The method of claim 9, wherein the first set of objects and second set of objects are stored as object nodes in a database, the set of first edge types and the set of second edge types are stored as edge nodes in the database, and the set of influence edges is stored as influence nodes in the database.

11. The method of claim 9, wherein the greater visibility comprises:
placing the group of reviews into an order such that reviews from reviewers with higher influence levels on the user are located earlier in the order than reviews from reviewers with lower influence levels.

12. The method of claim 9, further comprising:
creating a document that contains the group of reviews in which reviews in the group of reviews from reviewers having a higher influence level on the user are displayed earlier than reviews in the group of reviews from reviewers with lower influence levels when the document is displayed.

13. The method of claim 9, wherein the greater visibility comprises:
associating a graphical indicator with each review in the group of reviews.

14. The method of claim 13, wherein the graphical indicator is selected from at least one of a color, a flashing text, a font, a font size bolding, an icon, italics, underlining, or highlighting.

15. The method of claim 9, wherein influence levels on opinions for the items is selected for a group of items.

16. The method of claim 9, wherein the item is selected from one of a product, a service, an entity, a person, an organization, company, a partnership, a charity, an educational group, a social group, a team, a city, a government agency, a theme park, and a restaurant.

17. A computer program product for managing reviews, the computer program product comprising:
a non-transitory, computer readable storage medium comprising:
first program code for receiving a request for information about an item from a client device;
second program code for identifying a group of reviews associated with the item in the request;
third program code for identifying a user requesting the information about the item;
fourth program code for identifying, using a hypergraph, respective influence levels of reviewers on the user, wherein the hypergraph comprises:
a first set of objects representing people in a social network, wherein the reviewers and user are people in the social network;
a second set of objects representing opinions about items;
a set of first edge types that connect source objects in the first set of objects to target objects in the second set of objects, wherein a first edge from the set of first edge types represents an opinion expressed by a first person in the social network about a specified item;
a set of second edge types that connect the source objects to target objects in the first set of objects, wherein a second edge from the set of second edge types represents a relationship between the first person in the social network and a second person in the social network; and
a set of influence edges that connect the set of first edge types to the set of second edge types, wherein an influence edge represents an influence level that the first person has on the second person, wherein the influence level indicates a likelihood that the second person will have a same opinion as the first person, wherein the influence level is dependent on type of item; and
fifth program code for sending the group of reviews in a response to the request, enabling displaying the group of reviews on a display system for the client device such that reviews from reviewers having a higher influence level on the user are displayed with greater visibility than reviews from reviewers with lower influence levels, wherein the greater visibility facilitates formation of an opinion about the item with less frustration or in less time.

18. The computer program product of claim 17, wherein the first set of objects and second set of objects are stored as object nodes in a database in a computer system, the set of first edge types and the set of second edge types are stored as edge nodes in the database in the computer system, and the set of influence edges is stored as influence nodes in the database in the computer system.

19. The computer program product of claim 17, further comprising:
sixth program code, stored on the computer readable storage medium, for placing the group of reviews into an order such that reviews from reviewers with higher influence levels on the user are located earlier in the order than reviews from reviewers with lower influence levels.

20. The computer program product of claim 17, further comprising:
sixth program code, stored on the computer readable storage medium, for creating a document that contains the group of reviews in which reviews in the group of reviews from reviewers having a higher influence level on the user are displayed earlier than reviews in the group of reviews from reviewers with lower influence levels when the document is displayed.

21. The computer program product of claim 17, wherein the greater visibility comprises:
program code, stored on the computer readable storage medium, for associating a graphical indicator with each review in the group of reviews.

22. The computer program product of claim 21, wherein the graphical indicator is selected from at least one of a color, a flashing text, a font, a font size bolding, an icon, italics, underlining, or highlighting.

23. The computer program product of claim 17, wherein influence levels on opinions for the items is selected for a group of items.

24. The computer program product of claim 17, wherein the item is selected from one of a product, a service, an entity, a person, an organization, a company, a partnership, a charity, an educational group, a social group, a team, a city, a government agency, a theme park, and a restaurant.

* * * * *